(12) United States Patent
Yamamoto et al.

(10) Patent No.: US 10,275,645 B2
(45) Date of Patent: Apr. 30, 2019

(54) IMAGE DETERMINING DEVICE TO DETERMINE THE STATE OF A SUBJECT

(71) Applicant: NIKON CORPORATION, Tokyo (JP)

(72) Inventors: Tetsuya Yamamoto, Hasuda (JP); Masahiro Nei, Yokohama (JP); Isao Totsuka, Nishitokyo (JP); Tomoyuki Matsuyama, Kuki (JP); Masamitsu Yanagihara, Zama (JP); Satoshi Hagiwara, Yokohama (JP); Masakazu Sekiguchi, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/727,271

(22) Filed: Oct. 6, 2017

(65) Prior Publication Data

US 2018/0039827 A1 Feb. 8, 2018

Related U.S. Application Data

(62) Division of application No. 14/700,960, filed on Apr. 30, 2015, now abandoned, which is a division of
(Continued)

(30) Foreign Application Priority Data

Jan. 7, 2010 (JP) ................................ 2010-001901
Jan. 7, 2010 (JP) ................................ 2010-001902
Jan. 7, 2010 (JP) ................................ 2010-001903

(51) Int. Cl.
*G08B 21/04* (2006.01)
*G06K 9/00* (2006.01)
(Continued)

(52) U.S. Cl.
CPC ............ *G06K 9/00369* (2013.01); *G06T 7/30* (2017.01); *G08B 21/0476* (2013.01); *H04N 7/18* (2013.01); *H04N 7/181* (2013.01)

(58) Field of Classification Search
CPC ...... G06K 9/00369; G06T 7/004; H04N 7/18; G08B 21/0476
See application file for complete search history.

(56) References Cited

U.S. PATENT DOCUMENTS 3,425,387 A * 2/1969 Mitchell ............... A61B 5/1072
116/200
2003/0058111 A1 3/2003 Lee et al.
(Continued)

FOREIGN PATENT DOCUMENTS

CN 1332840 A 1/2002
CN 1503194 A 6/2004
(Continued)

OTHER PUBLICATIONS

Yuan-Fang Wang, Edward Y. Chang, Ken P. Cheng, "A Video Analysis Framework for Soft Biometry Security Surveillance", Nov. 11, 2005, VSSN'05, ACM 1-59593-242-9/05/0011, pp. 71-78.*
(Continued)

*Primary Examiner* — Siamak Harandi
(74) *Attorney, Agent, or Firm* — Oliff PLC

(57) ABSTRACT

To determine the state of a subject person with a simple structure, an image determining device includes: an imaging unit that captures an image from a first direction, the image including the subject person; a first detector that detects size information from the image, the size information being about the subject person in the first direction; a second detector that detects position-related information, the position-related information being different from the information detected by the first detector; and a determining unit that determines the state of the subject person, based on a result
(Continued)

of the detection performed by the first detector and a result of the detection performed by the second detector.

11 Claims, 12 Drawing Sheets

Related U.S. Application Data application No. 13/513,704, filed as application No. PCT/JP2010/073748 on Dec. 28, 2010, now Pat. No. 9,047,751.

(51) Int. Cl.
*H04N 7/18* (2006.01)
*G06T 7/30* (2017.01)

(56) References Cited

U.S. PATENT DOCUMENTS

| | | |
|---|---|---|
| 2004/0179736 A1 | 9/2004 | Yin |
| 2004/0211883 A1 | 10/2004 | Imagawa et al. |
| 2005/0289197 A1 | 12/2005 | Kan et al. |
| 2006/0291694 A1* | 12/2006 | Venetianer ......... G06K 9/00369 382/103 |
| 2007/0265533 A1 | 11/2007 | Tran |
| 2008/0285797 A1 | 11/2008 | Hammadou |
| 2010/0145998 A1* | 6/2010 | Poce ..................... G06Q 10/00 707/784 |
| 2012/0025989 A1* | 2/2012 | Cuddihy ............ G06K 9/00369 340/573.1 |

FOREIGN PATENT DOCUMENTS

| | | |
|---|---|---|
| CN | 1647535 A | 7/2005 |
| CN | 101404758 A | 4/2009 |
| EP | 1 148 316 A1 | 10/2001 |
| JP | H08-150125 A | 6/1996 |
| JP | H09-65325 A | 3/1997 |
| JP | H11-73582 A | 3/1999 |
| JP | 2000-099863 A | 4/2000 |
| JP | 2000-134611 A | 5/2000 |
| JP | 2001-052270 A | 2/2001 |
| JP | 2001-148011 A | 5/2001 |
| JP | 2001-325677 A | 11/2001 |
| JP | 2002-109666 A | 4/2002 |
| JP | 2002-142214 A | 5/2002 |
| JP | 2004-129280 A | 4/2004 |
| JP | 2008-052626 A | 3/2008 |
| JP | 2008-052631 A | 3/2008 |
| JP | 2008-092538 A | 4/2008 |
| JP | 3143307 U | 7/2008 |
| JP | 2008-282181 A | 11/2008 |
| JP | 2009-140407 A | 6/2009 |

OTHER PUBLICATIONS

Antonio Criminisi; Andrew Zimmerman; Luc van Gool; Simon Bramble; and David Compton, "A New Approach to Obtain Height Measurements from Video", Jan. 1, 21998, Proceedings of SPIE—The International Society of Optical Engineering.*
Shaou-Gang Miaou; Pei-Hsu Sung;, and Chia-Yuan Huang, A Customized Human Fall Detection System Using Omni-Camera Images and Personal Information, Apr. 2-4, 2006, Proceedings of the $1^{st}$ Distributed Diagnosis and Home Healthcare (D2H2) Conference, Arlington, Virginia, pp. 39-42.*
Erno Jeges; Istvan Kispal; and Zoltan Hornak, "Measuring Human Height Using Calibrated Camera", 2008, IEEE, Krakow, Poland, May 25-27, 2008, pp. 755-760.*
Feb. 15, 2011 International Search Report issued in International Patent Application No. PCT/JP2010/073748.
Aug. 25, 2014 Office Action issued in Japanese Application No. 2010-001901.
Jan. 28, 2014 Office Action issued in Japanese Application No. 2010-001901.
Jan. 28, 2014 Office Action issued in Japanese Application No. 2010-001902.
Jan. 28, 2014 Office Action issued in Japanese Application No. 2010-001903.
May 16, 2014 Office Action issued in Chinese Application No. 2010-80055107.6.
Sep. 16, 2013 Office Action issued in Chinese Application No. 2010-80055107.6.
Jun. 30, 2014 Office Action issued in U.S. Appl. No. 13/513,704.
Oct. 3, 2016 Office Action Issued in U.S Appl. No. 14/700,960.
May 8, 2017 Office Action Issued in U.S Appl. No. 14/700,960.
Apr. 24, 2018 Office Action issued in Indian Application No. 6007/DELNP/2012.
Jun. 20, 2018 Office Action issued in Chinese Patent Application No. 201510594449.X.
Jan. 14, 2019 Office Action issued in Chinese Patent Application No. 201510594449.X.

* cited by examiner

IMAGE DETERMINING DEVICE TO DETERMINE THE STATE OF A SUBJECT

This Application is a Divisional Application of application Ser. No. 14/700,960 filed Apr. 30, 2015, which is a Divisional of application Ser. No. 13/513,704 filed Jun. 4, 2012, which is a National Phase Application of International Application No. PCT/JP2010/073748 filed Dec. 28, 2010, which claims the benefit of Japanese Application No. 2010-001903 filed Jan. 7, 2010, Japanese Application No. 2010-001902 filed Jan. 7, 2010 and Japanese Application No. 2010-001901 filed Jan. 7, 2010. The disclosure of each of the prior applications is incorporated herein by reference in its entirety.

TECHNICAL FIELD

The present invention relates to a security system using an image determining device.

BACKGROUND ART

There have been video monitoring devices that were developed for capturing images of elderly people living alone with a camera and determining presence or absence of a problem. Also, to protect the privacy of a person to be imaged by a camera, adding a mosaic pattern to each captured video image has been suggested (Patent Document 1, for example).

PRIOR ART DOCUMENT

Patent Document

Patent Document 1: Japanese Unexamined Patent Application Publication No. 2002-142214

SUMMARY OF THE INVENTION

Problems to be Solved by the Invention

However, a conventional video monitoring device constantly captures images with a camera to detect a problem in a subject person, and monitors the subject person with another monitoring device. Therefore, complicated processes need to be performed.

Means for Solving the Problems

An image determining device of the present invention comprises: an imaging unit that captures an image from a first direction, the image including a subject person; a first detector that detects size information from the image, the size information being about the subject person in the first direction; a second detector that detects position-related information, the position-related information being different from the information detected by the first detector; and a determining unit that determines a state of the subject person, based on a result of the detection performed by the first detector and a result of the detection performed by the second detector.

In this case, the second detector may detect position information with respect to a second direction, the second direction being different from the first direction. In this case, the second detector may detect position information about the subject person or a location near the subject person in the second direction. Also, the first detector may detect a size of the head of the subject person, and the determining unit may determine the state of the subject person by associating the second-direction position information with the size of the head of the subject person. Further, the image determining device may further comprise a storage unit that stores a reference value for the size information, in accordance with the second-direction position information.

Also, the image determining device of the present invention may be configured so that the first detector detects a size of the head of the subject person. Also, the determining unit may determine the state of the subject person, based on a plurality of images captured at different times. Also, the imaging unit may image the subject person at first predetermined intervals, and, in accordance with a result of the determination made by the determining unit, may image the subject person at second predetermined intervals, the second predetermined intervals being shorter than the first predetermined intervals. Further, the imaging unit may capture a still image.

The image determining device of the present invention may further comprise a determining sensor that determines whether the subject person exists. In this case, the imaging unit may perform the imaging in accordance with a result of the determination made by the determining sensor.

The image determining device of the present invention may further comprises a communicating unit that communicates with another device. In this case, when the communicating unit sends a result of the determination on the subject person to the another device, the determining unit may prohibit at least sending of the image captured at first predetermined intervals. Also, in this case, the determining unit may determine whether to allow sending of the image captured at second predetermined intervals, the second predetermined intervals being shorter than the first predetermined intervals.

Also, the image determining device of the present invention may further comprise a second power source that is different from a first power source supplying power to the imaging unit.

Also, the image determining device of the present invention may be configured so that the second detector is a relative position detector that detects information about a relative position between the imaging unit and the subject person. In this case, the imaging unit may include an optical system, and the relative position detector detects information about a relative position between the optical system and the subject person. Also, the relative position detector may detect an anticipated angle of the optical system with respect to the subject person. Further, the imaging unit may include an imaging element, and the relative position detector may detect the information about the relative position between the imaging unit and the subject person, based on a position of an image of the subject person captured by the imaging element.

The image determining device of the present invention may further comprise a correcting unit that corrects the size information about the subject person detected by the first detector, in accordance with a result of the detection performed by the relative position detector. Also, the image determining may be configured so that the imaging unit images a structural object and the subject person, and based on the imaged structural object and the imaged subject person, the determining unit determines the state of the subject person.

An image determining device of the present invention comprises: an imaging unit that captures an image from a first direction; an acquiring unit that acquires height information about a first subject person and height information about a second subject person; and an identifying unit that identifies the first subject person and the second subject person in accordance with the height information from the acquiring unit, when the captured image includes at least one of the first subject person and the second subject person.

In this case, the identifying unit may determine a state of at least one of the first subject person and the second subject person, in accordance with the height information from the acquiring unit. Also, the imaging unit may image the heads of the first subject person and the second subject person. Also, the imaging unit may perform imaging when at least one of the first subject person and the second subject person moves from an imaging area of the imaging unit to a non-imaging area.

The image determining device may be configured so that the acquiring unit acquires respective heights of the first subject person and the second subject person as the height information. Also, the acquiring unit may acquire the height information in accordance with a result of the imaging performed on the first subject person and the second subject person by the imaging unit. Also, the image determining device may be configured so that the imaging unit images a structural object, and based on the imaged structural object, the acquiring unit acquires the height information about at least one of the first subject person and the second subject person.

The image determining device of the present invention may be configured so that the imaging unit simultaneously images the first subject person and the second subject person. Further, the image determining device may be configured so that the imaging unit images the first subject person and the second subject person when the first subject person and the second subject person are in the same posture.

Effects of the Invention

According to the present invention, the privacy of a subject person can be secured, and the state of the subject person can be determined with a simple structure.

BRIEF DESCRIPTION OF DRAWINGS

FIGS. 5A and 5B are graphs showing changes in the size of an image formed by the wide-angle lens system; wherein FIG. 5A is a graph showing the distance from the front-side focal point of the wide-angle lens system to the head of the subject person, and the image size; and FIG. 5B is a graph formed by converting FIG. 5A into the height from the floor;

MODES FOR CARRYING OUT THE INVENTION

First Embodiment

An image determining device of this embodiment can be placed in a room of a house or office or the like, and a case where the image determining device is placed in a living room is described in the following.

Figure 1:
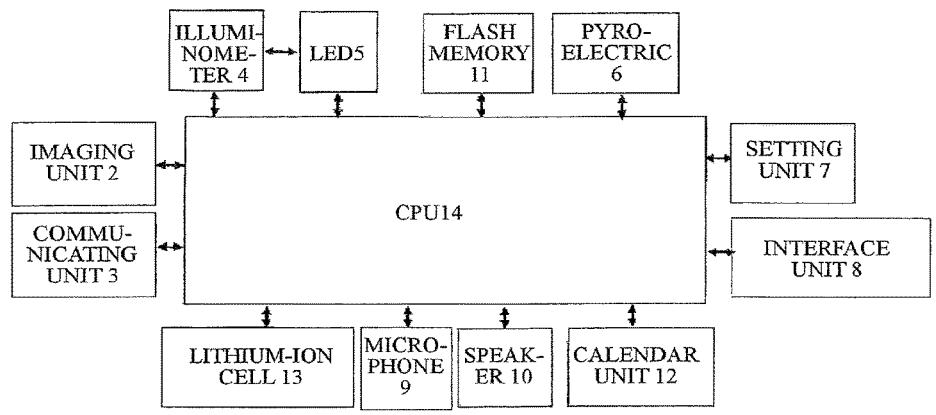
FIG. 1 is a block diagram of an image determining device 1 according to this embodiment.
Figure 2:
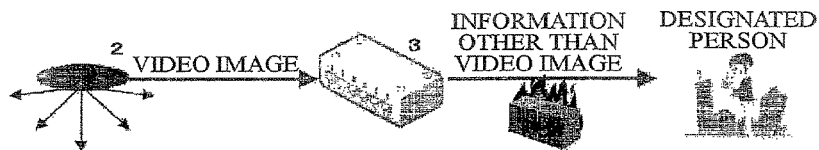
FIG. 2 is a diagram showing the main parts of the image determining device 1 of this embodiment.

FIG. 1 is a block diagram of the image determining device 1 of this embodiment. FIG. 2 is a diagram showing the main parts of the image determining device 1. As shown in FIGS. 1 and 2, the image determining device 1 includes: an imaging unit 2 that performs imaging; a communicating unit 3 that communicates with another device; an illuminometer 4 that measures the illuminance in the living room when the imaging unit 2 performs imaging; a LED (Light Emitting Diode) 5 that illuminates a subject person in the living room when the illuminance measured by the illuminometer 4 is low; a pyroelectric sensor 6 that determines whether the subject person is present; a setting unit 7 that configures various kinds of settings in the image determining device 1; an interface unit 8 for cooperating with a lighting fixture or an electric appliance in the living room; a microphone 9 that records the voice of the subject person; and a speaker 10 for speaking to the subject person. The image determining device 1 also includes: a flash memory 11 that is a storage medium storing captured images and position information as to a specific point in the living room when the subject person is present in the living room; and a calendar unit 12 that includes a crystal oscillator and a timer integrated circuit, automatically updates calendar information indicating the year, month, day, hour, minute, and second, and stores plans of the subject person.

The image determining device 1 is also connected to a lithium-ion cell 13 as a backup power source in case power from the primary source (a household power source in this embodiment) is not supplied due to a power failure or the like. The backup power source is not necessarily a lithium-ion cell. A household solar power system may be used, or a capacitor may be used in place of the lithium-ion battery.

A CPU 14 controls the entire image determining device 1, and is electrically connected to the respective components. It goes without saying that the CPU 14 and the setting unit 7 are electrically connected to each other even if the setting unit 7 is a remote controller.

(Imaging Unit 2)

The imaging unit 2 is placed in the center of the ceiling of the living room, and mainly captures images of the head of the subject person. In this embodiment, the height of the ceiling of the living room is 2.6 m (see FIG. 4).

Figure 3:
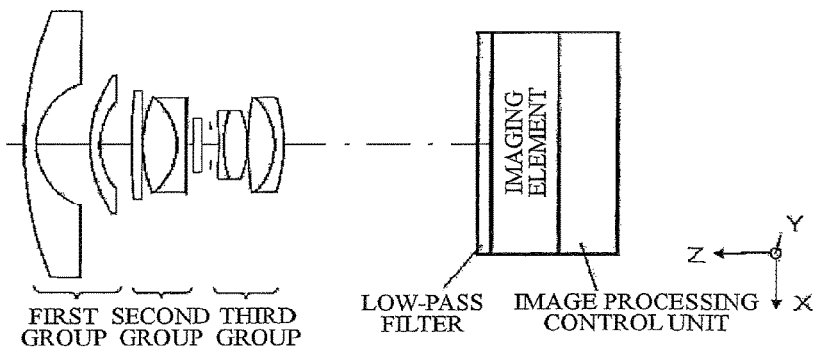
FIG. 3 is a diagram showing the structure of the imaging unit 2.

FIG. 3 is a diagram showing the structure of the imaging unit 2.

As shown in FIG. 3, the imaging unit 2 includes: a wide-angle lens system with a three-group structure; a low-pass filter; an imaging element formed with a CCD or CMOS or the like; and a circuit board that drives and controls the imaging element. The imaging element of this embodiment is 23.7 mm×15.9 mm in size, and has 4000× 3000 (12 millions) pixels, with the size of each one pixel being 5.3 μm. However, the size and number are not limited to the above.

The above wide-angle lens system includes: a first group including two negative meniscus lenses; a second group including a positive lens, a cemented lens, and an infrared cutoff filter; and a third group including two cemented lenses. A diaphragm is provided between the second group and the third group. The wide-angle lens system of this embodiment has a focal length of 6.188 mm in the entire system, and has a maximum view angle of 80 degrees.

The wide-angle lens system is not limited to the above three-group structure, and it is possible to arbitrarily change the number of lenses in each group, the lens structure, the focal length, and the angle of view.

Figure 5A:
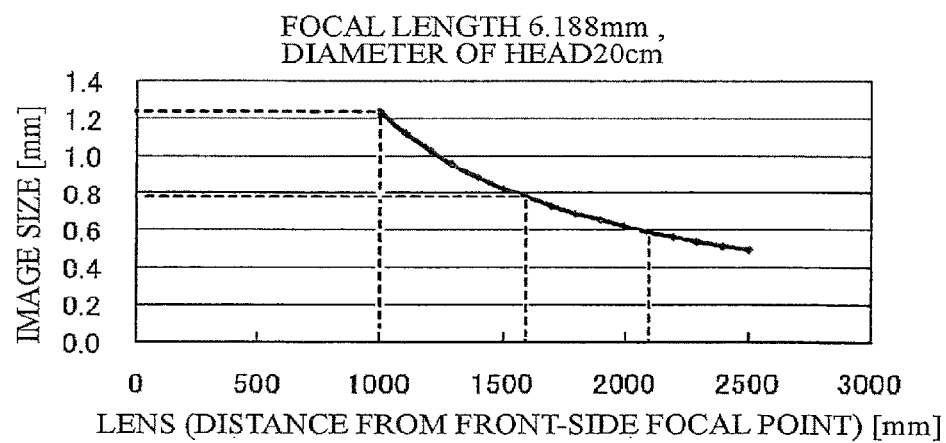
Figure 5B:
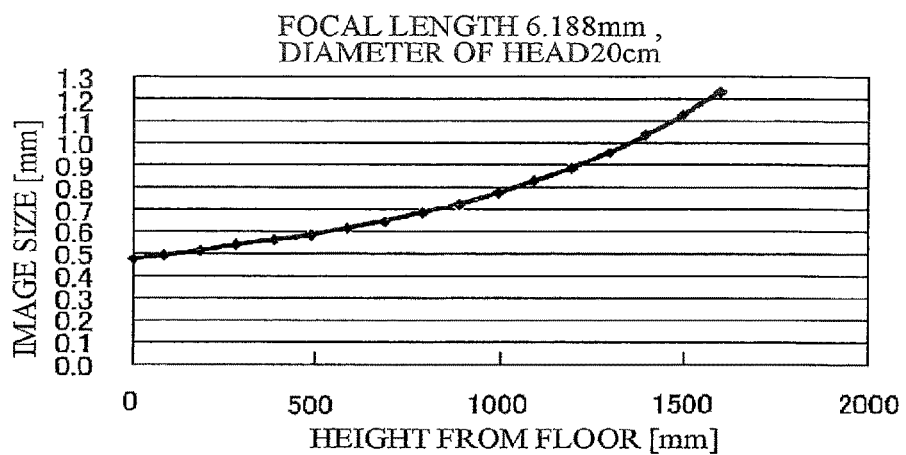

FIGS. 5A and 5B are graphs showing changes in the size of an image formed by the wide-angle lens system. FIG. 5A is a graph showing the distance from the front-side focal point of the wide-angle lens system to the head of the subject person, and the image size. FIG. 5B is a graph formed by converting FIG. 5A into the height from the floor.

Where the wide-angle lens system of this embodiment has a focal length of 6.188 mm as described above, and the diameter of the head of the subject person is 200 mm, the size of the head of the subject person imaged in the imaging element of the imaging unit 2 is 1.238 mm when the distance from the front-side focal point of the wide-angle lens system to the position of the head of the subject person is 1000 mm (when the subject person is standing). When the head of the subject person is lowered from that position by 300 mm, and the distance from the front-side focal point of the wide-angle lens system to the position of the head of the subject person becomes 1300 mm, the size of the head of the subject person imaged in the imaging element of the imaging unit 2 becomes 0.952 mm, and there is a 0.286 mm (23.1%) change in the image size.

Likewise, when the distance from the front-side focal point of the wide-angle lens system to the position of the head of the subject person is 2000 mm (when the subject person is in a semi-crouching position), the size of the head of the subject person imaged in the imaging element of the imaging unit 2 is 0.619 mm. When the head of the subject person is lowered from that position by 300 mm, the size of the head of the subject person imaged in the imaging element of the imaging unit 2 becomes 0.538 mm, and there is a 0.081 mm (13.1%) change in the image size. From that, it is apparent that as the distance from the front-side focal point of the wide-angle lens system to the head of the subject person becomes longer, the change in the image size becomes smaller.

As described above, with the image determining device 1 of this embodiment, the distance from the front-side focal point of the wide-angle lens system to the subject person is determined from the size of an image of the head of the subject person when the size of the head of the subject person is known. Accordingly, it is possible to determine the posture of the subject person (standing, semi-crouching, or lying on the floor) and a change in the posture while maintaining the privacy of the subject person.

Figure 6:
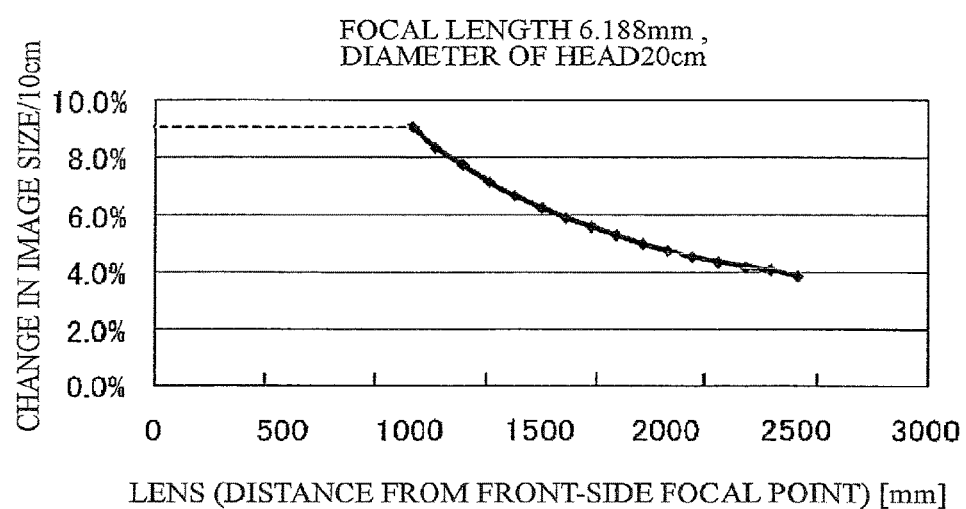
FIG. 6 is a graph that shows the rate of change in the image size based on FIGS. 5A and 5B.

FIG. 6 is a graph that shows the rate of change in the image size based on FIGS. 5A and 5B, and shows the rate of change in the size of the image formed by the wide-angle lens system every time the position of the head of the subject person is changed by 100 mm.

When the distance from the front-side focal point of the wide-angle lens system to the position of the head of the subject person is increased from 1000 mm by 100 mm, the rate of change in the image size is as high as 9.1%. Therefore, with the image determining device 1 of this embodiment, two or more subject persons can be identified from the difference in height, if the height difference is at least approximately 100 mm.

When the distance from the front-side focal point of the wide-angle lens system to the position of the head of the subject person is increased from 2000 mm by 100 mm, the rate of change in the image size becomes as low as 4.8%. With the image determining device 1 of this embodiment, however, the change in the posture of the subject person can be detected even if the distance from the front-side focal point of the wide-angle lens system to the position of the head of the subject person becomes longer, which will be described later in detail.

FIGS. 5A, 5B and 6 are graphs showing cases where the subject person is present in a position at a low angle of view of the wide-angle lens system (immediately below the wide-angle lens system). If the subject person is present in a peripheral view-angle position of the wide-angle lens system, there would be the influence of a distortion depending on the anticipated angle with respect to the subject person, which is not shown in the graphs of FIGS. 5A, 5B and 6. The influence of a distortion will be described later.

Luminous flux incident on the wide-angle lens system enters the imaging element via the low-pass filter, and the circuit board converts the output of the imaging element into a digital signal. An image processing control unit formed with an ASIC performs image processing, such as white balance adjustment, sharpness adjustment, gamma correction, and gray level correction, on the image signal converted into the digital signal, and also performs image compression using JPEG or the like. The still image compressed using JPEG is recorded on the flash memory 11. To record a video image, the image signal should be subjected to MPEG processing, and should be recorded on the flash memory 11.

Figure 4:
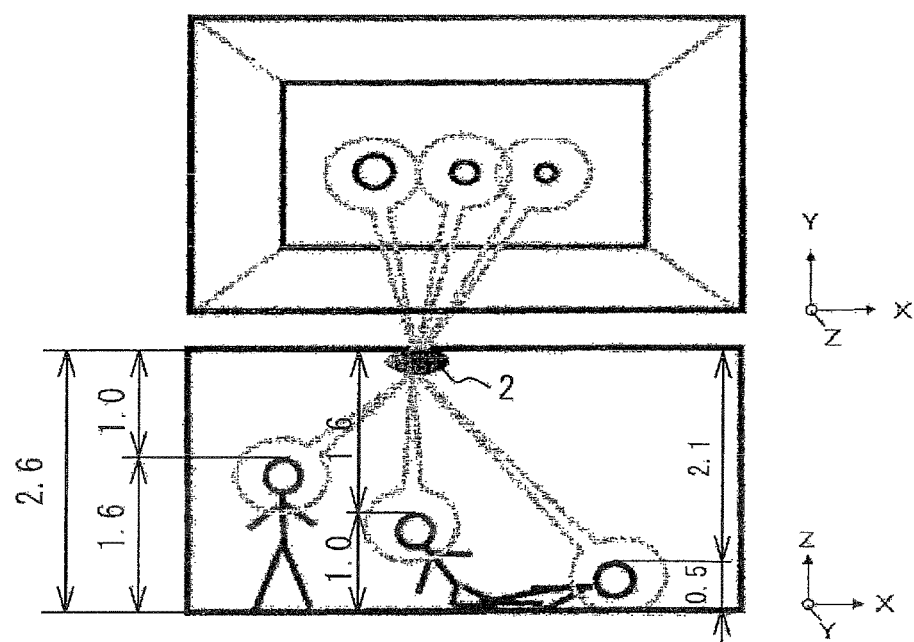
FIG. 4 is a diagram showing changes in the size of the head in accordance with postures of the subject person.

FIG. 4 is a diagram showing changes in the size of the head in accordance with postures of the subject person. As shown in FIG. 4, the imaging unit 2 is attached to the ceiling of the living room, and captures an image of the position of the head of the subject person. When the subject person is standing (the left side), the size of the head in the image is large. When the subject person is lying on the floor (the right side), the size of the head in the image is small. When the subject person is in a semi-crouching position (the center), the size of the head in the image is smaller than that imaged when the subject person is standing, but is larger than that imaged when the subject person is lying on the floor. In this embodiment, a check is made to determine whether the subject person is fine, based on the state of the subject person or the size of the head that varies in the Z-direction. In this manner, attention is paid to the size of the head of the subject person that varies in the Z-direction as described above. Accordingly, the privacy of the subject person can be protected.

When there is something wrong with the subject person and the subject person is lying on the floor or the like, a zoom lens added to the above described wide-angle lens system continuously captures images of the eye and mouth, so that a check can be made to determine whether the eye is open based on pattern matching, whether the eyeball is moving, whether the mouth is moving, or whether the subject person is breathing based on movement of the mouth.

Further, the high-frequency component is extracted from the signal supplied from the imaging element, and the lens position in which the high-frequency component become largest is detected. In this manner, focus detection is performed, and this is known as contrast AF. Contrast AF is also applied to this embodiment, and part of the wide-angle lens system may be adjusted to an optimum position.

Normally, the imaging by the imaging unit 2 only involves capturing 48 still images per day if the imaging is performed once every 30 minutes. Accordingly, the power supplied to the image determining device 1 and the recording area in the flash memory 11 can be saved. Also, in accordance with date information supplied from the calendar unit 12, the imaging interval may be varied with the time of day. Specifically, the imaging interval may be 30 minutes in the daytime, and may be 20 minutes in the nighttime. If the imaging element is a CMOS, and an electronic shutter (a rolling shutter) is used, instead of a mechanical shutter, no noise would be generated at the time of imaging, and the sleep of the subject person would not be interrupted.

Also, instead of still images, short video images each lasting 3 to 5 seconds may be captured.

When the CPU 14 detects a problem from a captured image, the imaging unit 2 captures about a hundred successive images per minute, or captures about a hundred images at 15-second intervals, in accordance with an instruction from the CPU 14. The imaging interval may be set by using the setting unit 7.

The imaging time and ISO sensitivity at the time when the imaging unit 2 captures still images are determined by the illuminance detected by the illuminometer 4. When the living room is dark, the ISO sensitivity should be made higher, and the imaging time should be prolonged. In a case where the image determining device 1 is placed in a bedroom, and the subject person puts out all the lights when asleep, the LED 5 may illuminate the subject person, or the interface unit 8 cooperates with the lighting fixture in the bedroom, to illuminate the subject person for a few seconds (approximately 3 seconds) and secure the brightness necessary for imaging. The pyroelectric sensor 6 checks the position of the subject person, and the position of the LED 5 is adjusted by a drive unit (not shown) so as to illuminate the checked position with illuminating light. In this manner, the subject person can be efficiently illuminated. The LED 5 may be attached to the ceiling, or may be placed at any location in the bedroom. A light source other than a LED may be used. If the lighting fixture in the bedroom suffices, the LED 5 may not be provided. As the lighting fixture in the bedroom, a LED lamp may be used.

Further, captured still images of the subject person are only required to be clear enough to detect a problem of the subject person, and therefore, those still images differ from conventional still images for viewing. When imaging is performed in a dark-lit room, the infrared cutoff filter provided in the wide-angle lens system may be retracted by a retracting mechanism (not shown), so as to secure a sufficient amount of light.

(Communicating Unit 3)

The communicating unit 3 is formed with an antenna, a transmitter, a receiver, and the like. In this embodiment, the communicating unit 3 can be placed in a corner of a living room. The communicating unit 3 reports the occurrence or non-occurrence of a problem of the subject person to a designated other device (a portable telephone of a member of the family of the subject person or a personal computer at a security company), and receives audio information and the like from the other device. When there is nothing wrong with the subject person, the communicating unit 3 transmits a message indicating no problem, together with date information, to the designated other device, but does not transmit any captured image. In this manner, the privacy of the subject person can be protected. As will be described later, when there is something wrong with the subject person, images can be transmitted under predetermined conditions.

(Pyroelectric Sensor 6)

The pyroelectric sensor 6 is an infrared sensor. The pyroelectric sensor 6 detects infrared rays generated from a person, and outputs the detection result to the CPU 14. In this embodiment, the pyroelectric sensor 6 is placed so as to detect infrared rays via the wide-angle lens system. Pyroelectric sensors 6 may be provided in the living room.

Upon detecting the subject person entering the living room based on the output of the pyroelectric sensor 6, the CPU 14 instructs the imaging unit 2 to perform imaging, and may cause the imaging unit 2 to perform imaging thereafter at 30-minute intervals. If the subject person moves out of the living room and returns a few minutes later, there is no need to reset the time counter.

Upon detecting absence of the subject person from the living room based on the output of the pyroelectric sensor 6, the CPU 14 controls the imaging unit 2 not to perform imaging even at a scheduled time for imaging. In a case where the subject person does not enter the living room (and is not present in any other room) for a few days, and there is not a reported plan of absence from home in the schedule stored in the calendar unit 12, the CPU 14 reports the absence of the subject person and a possibility of a problem to the designated other device via the communicating unit 3.

(Calendar Unit 12)

As described above, the calendar unit 12 automatically updates calendar information indicating the year, month, day, hour, minute, and second, and stores plans of the subject person. A plan of the subject person may be input through the setting unit 7, or a date (duration) and destination may be input through the microphone 9. In that case, the calendar unit 12 is equipped with a voice recognition function. However, only a simple phonetic dictionary for dates and destinations and the like needs to be prepared, and accordingly, the system does not become larger. A plan may be voice-input through the microphone 9, in response to an inquiry (as to when and where) from the speaker 10.

The calendar unit 12 notifies the subject person of the next day's plan via the speaker 10 at night, and again notifies the next morning.

In accordance with a plan that is input to the calendar unit 12, the CPU 14 may set an alarm clock or display the plan on a television screen via the interface unit 8. Also, where a request to watch a television program is input, the CPU 14 may cause the television set to be be automatically turned on or cause the requested program to be recorded.

(Calibration)

Figure 7:
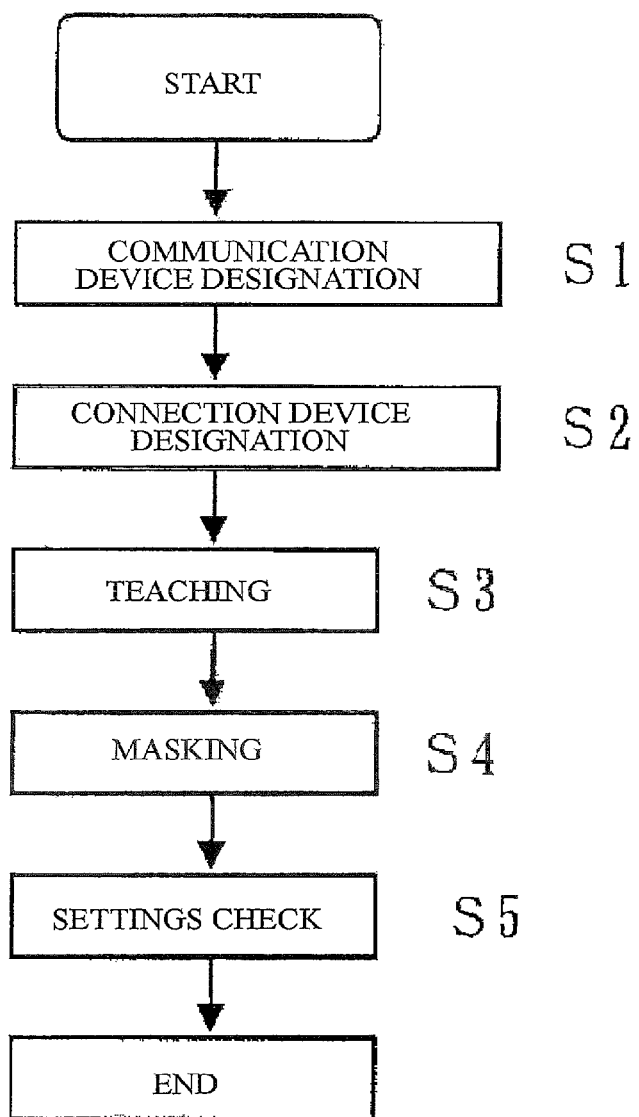
FIG. 7 is a flowchart about a case where the image determining device is installed in a living room.

FIG. 7 is a flowchart about a case where the image determining device of this embodiment is installed in a living room. In the following, the installation of the image determining device is described, with reference to the flowchart of FIG. 7.

In step 1, a communication device to which presence or absence of a problem of the subject person is to be reported is designated. Here, a mobile device such as a portable telephone or a personal computer of a family member, a personal computer of a security company, or the like can be designated. Also, privacy levels of the family member and a security company can be set. For example, in a case where the privacy level of the family member may be lowered, transfers of images captured when a problem occurs are allowed, or the later described mask processing can be cancelled or can be given a lower mask processing level. In a case where the privacy level of a security company is made higher than that of a family member, transfers of images captured when a problem occurs can be prohibited, and only transfers of images masked through the later described mask processing can be allowed.

Based on the designation made in step 1, the CPU 14 reports presence or absence of a problem of the subject person to the designated device via the communicating unit 3.

In step 2, a connection device such as a television set, an audio device, or a clock is designated. Specifically, a wired or wireless connection with a television set is made via the interface unit 8, for example, so that the activity schedule stored in the calendar unit 12 is displayed on the television set, the television set is turned on a date and a time designated in the calendar unit 12, or a requested program is recorded. Likewise, an audio device is turned on or an alarm clock is started on a date and a time stored in the calendar unit 12.

In step 3, the CPU 14 stores the relationship between a typical position in the living room and the position of the head of the subject person into the flash memory 11.

Figure 8:
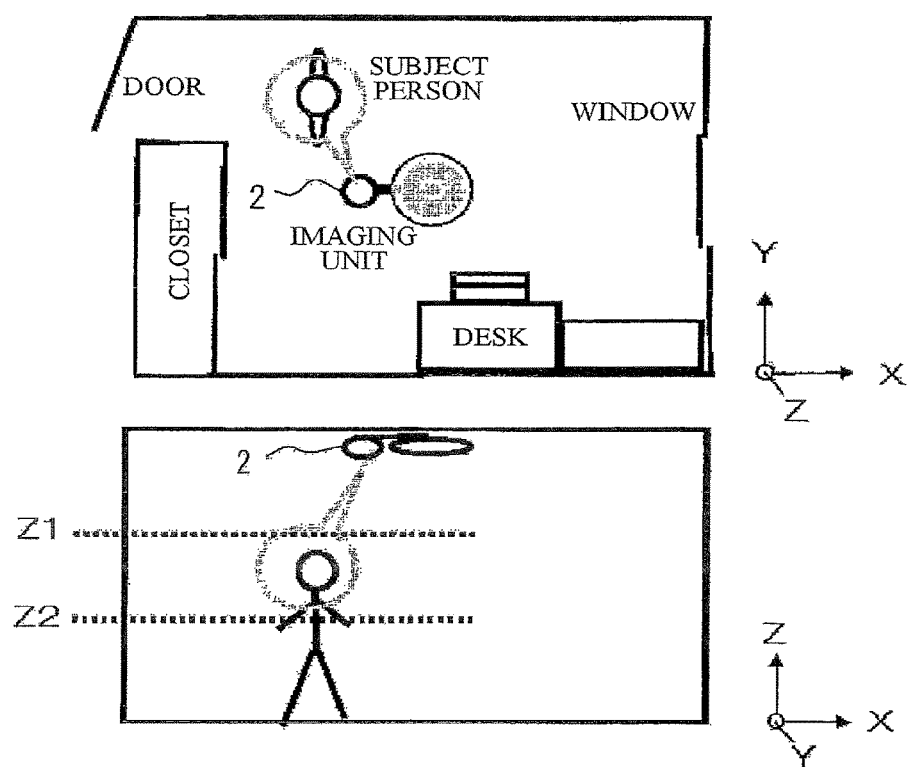
FIG. 8 is a diagram illustrating a case where the subject person is in a walking area in the living room.

FIG. 8 is a diagram illustrating a case where the subject person is in a walking area in the living room (in an area where sofas, tables, chairs, and the like are not placed in the X-direction and the Y-direction).

The CPU 14 captures an image of the head of the subject person with the imaging unit 2 when the subject person is standing in the living room as shown in FIG. 8, for example. The CPU 14 associates the position of the head in the Z-direction with the size of the head in the Z-direction when the subject person is standing, and stores the relationship into the flash memory 11. At this point, the CPU 14 also recognizes a position in the X-direction and the Y-direction in which the subject person is likely to stand in the living room. Specifically, the CPU 14 recognizes a position in which sofas, tables, chairs, and the like are not placed. Further, in addition to the size of the head of the subject person in the Z-direction, the CPU 14 may estimate, from the captured image, the size of the head in a region between a position Z1 slightly higher than the position of the head of the subject person and a position Z2 slightly lower than the position of the head of the subject person. The CPU 14 may store the estimated size of the head. In this manner, the allowable range of the size of the head when the subject person is in a normal state can be set.

Figure 9:
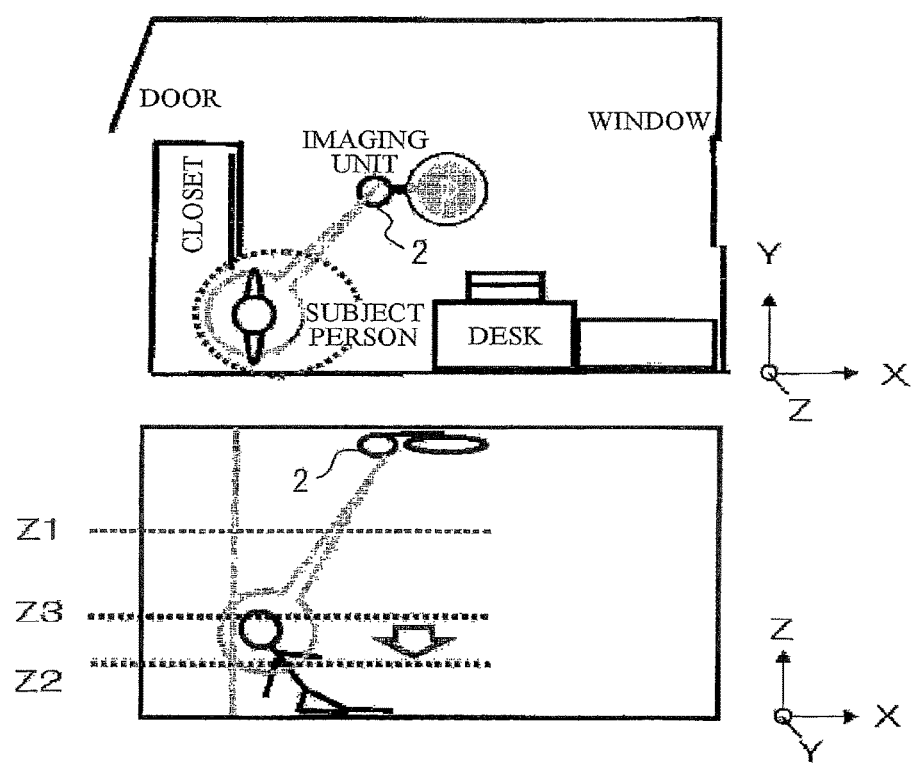
FIG. 9 is a diagram illustrating a case where the subject person is near the closet.

FIG. 9 is a diagram illustrating a case where the subject person is near the closet.

When the subject person is near the closet, the subject person is considered to be standing or in a crouching position. Therefore, the CPU 14 captures an image of the head of the subject person in a crouching position with the imaging unit 2, as shown in FIG. 9. The CPU 14 then associates the position with the size at a height Z3, and stores the relationship into the flash memory 11. The CPU 14 also sets sizes of the head in a region between the heights Z1 and Z2 as the allowable range in an area near the closet. When the size of the head of the subject person is equal to or smaller than the size at the height Z3 over a long period of time even though the size is within the allowable range between the heights Z1 and Z2, there is a possibility that a problem has occurred in the subject person. In such a case, the CPU 14 continuously captures images of the head. Based on pattern matching, the CPU 14 determines that the subject person is in a normal state when the head is moving, but talks to the subject person through the speaker 10 when the head is not moving.

Figure 10:
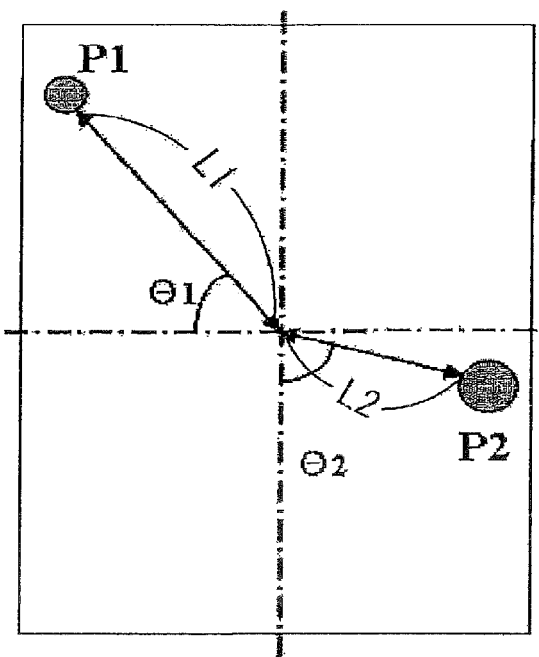
FIG. 10 is a diagram showing a change in the image size of the head of the subject person imaged in the imaging element in accordance with positions of the subject person.

FIG. 10 is a diagram showing a change in the size of the head of the subject person imaged in the imaging element in accordance with positions of the subject person. Here, the center of the imaging element matches the center of the optical axis of the wide-angle lens system.

Even in a case where the subject person is standing in the living room as shown in FIG. 8, the size of the head imaged by the imaging unit 2 varies between when the subject person is standing near the door and when the subject person is standing immediately below the imaging unit 2.

As shown in FIG. 10, the image size, the distance L1 from the center of the imaging element, and the angle $\theta 1$ with respect to the center of the imaging element are determined from an image formed at P1 in the imaging element. The distance L1 from the center of the imaging element is a parameter representing the distance between the front-side focal point of the wide-angle lens system and the head of the subject person. The angle $\theta 1$ with respect to the center of the imaging element is a parameter representing the anticipated angle of the wide-angle lens system with respect to the subject person. As described above, even where the subject person is in the same posture, the size of the image formed at P1 in the imaging element and the size of the image formed at P2 in the imaging element are different from each other. Therefore, the CPU 14 corrects the sizes of the captured images, based on the distances L1 and L2 from the center of the imaging element, and the angles $\theta 1$ and $\theta 2$ with respect to the center of the imaging element. In other words, where the subject person is in the same posture, a correction is performed so that the size of the image formed at P1 in the imaging element and the size of the image formed at P2 in the imaging element become substantially equal to each other. The parameters related to the correction are also stored into the flash memory 11. In the above description, the position of the subject person is detected based on the position of an image formed in the imaging element. Instead, the distance between the imaging unit 2 and the subject person may be detected by emitting light toward the subject person and receiving the light reflected from the subject person.

As described above, the image determining device 1 of this embodiment can detect the positional relationship between the imaging unit 2 and the subject person (the distance to the subject person and the anticipated angle with respect to the subject person). Accordingly, the posture of the subject person can be accurately detected, no matter which part of the living room the subject person is in.

In a case where there are two or more subject persons, the heights and the head sizes vary. Therefore, head sizes of each subject person in accordance with positions of the head in the Z-direction, and the position information in the X- and Y-directions are stored into the flash memory 11. In that case, images of the subject persons may be simultaneously captured by the imaging unit 2, or may be captured separately from one another.

Further, the heights and the head sizes (the diameters of the heads) of the subject persons may be input through the setting unit 7, and be stored into the flash memory 11. When a first subject person enters the living room through the door, and the head of the first subject person is imaged by the imaging unit 2, for example, the CPU 14 can recognize the first subject person entering the living room based on the size of the captured image and the height information stored in the flash memory 11, as the heights and the head sizes of the subject persons are stored in the flash memory 11. In this manner, the heights of two or more subject persons are stored into the flash memory 11, so that the subject persons can be identified based on the height differences even though there are no differences in the head size, while the privacy of the subject persons is maintained.

However, when the subject persons are in semi-crouching positions or are lying on the floor, there are no substantial differences in height, and the subject persons cannot be identified. Even in such a situation, one of particularly serious problems occurs when one of the subject persons is left in the living room.

If images of subject persons leaving the living room are captured near the door, the CPU 14 can determine which ones have left the living room and which one remains in the living room, using the output of the pyroelectric sensor 6. In this manner, the imaging unit 2 of this embodiment captures images of subject persons before the subject persons move out of the imaging area of the imaging unit 2, so that not only presence or absence of a person in the living room but also which one remains in the living room can be determined.

Also, a template image of a subject person (an image of the head of the subject person captured by the imaging unit 2) may be stored into the flash memory 11, and template matching may be performed, to identify the subject person who is lying on the floor.

When a subject person enters the living room, an image of the subject person standing immediately below the imaging unit 2 is captured, so that the subject person can be accurately identified based on the height.

Instead of inputting the height and the head size of a subject person, images of a structural object (such as the door) in the living room and the subject person may be captured, and, if the size of the structural object (the height of the door being 2 m, the width being 1 m, for example) is known, the height and the head size of the object may be estimated from the structural object. In this case, the size of the structural object should be recorded on the flash memory 11, and the imaging unit 2 preferably captures an image of each person in the same posture (a standing posture).

In a case where a subject person is a child, the height and the head size increase. Therefore, a reference still image of the child should be taken once a year, for example. When the layout of the room is changed, the relationship between head sizes corresponding to positions of the head of each subject person in the Z-direction and the position information in the X- and Y-directions should be updated.

Further, based on the output of the pyroelectric sensor 6, the CPU 14 stores the times of the day at which the subject person spends time in the living room on weekdays and holidays are stored into the flash memory 1.

In step 4, masking is performed on the captured image. If the subject person does not request the masking, this step may be skipped. The masking is performed by lowering the resolution of the entire captured image, or adding a mosaic pattern to the parts other than the head or lowering the resolution of the parts other than the head, or detecting the flesh-colored portions from the captured image and adding a mosaic pattern to the flesh-colored portions or lowering the resolution of the flesh-colored portions, for example.

In step 5, the settings, such as the time intervals at which an image is captured, and the volume of sound from the speaker 10, are checked. When sound is emitted from the speaker 10 or the voice of the subject person is collected by the microphone 9, the CPU 14 controls the interface unit 8 to lower the volume of sound emitted from the television set and the audio device.

(Operation Flowchart)

Figure 11:
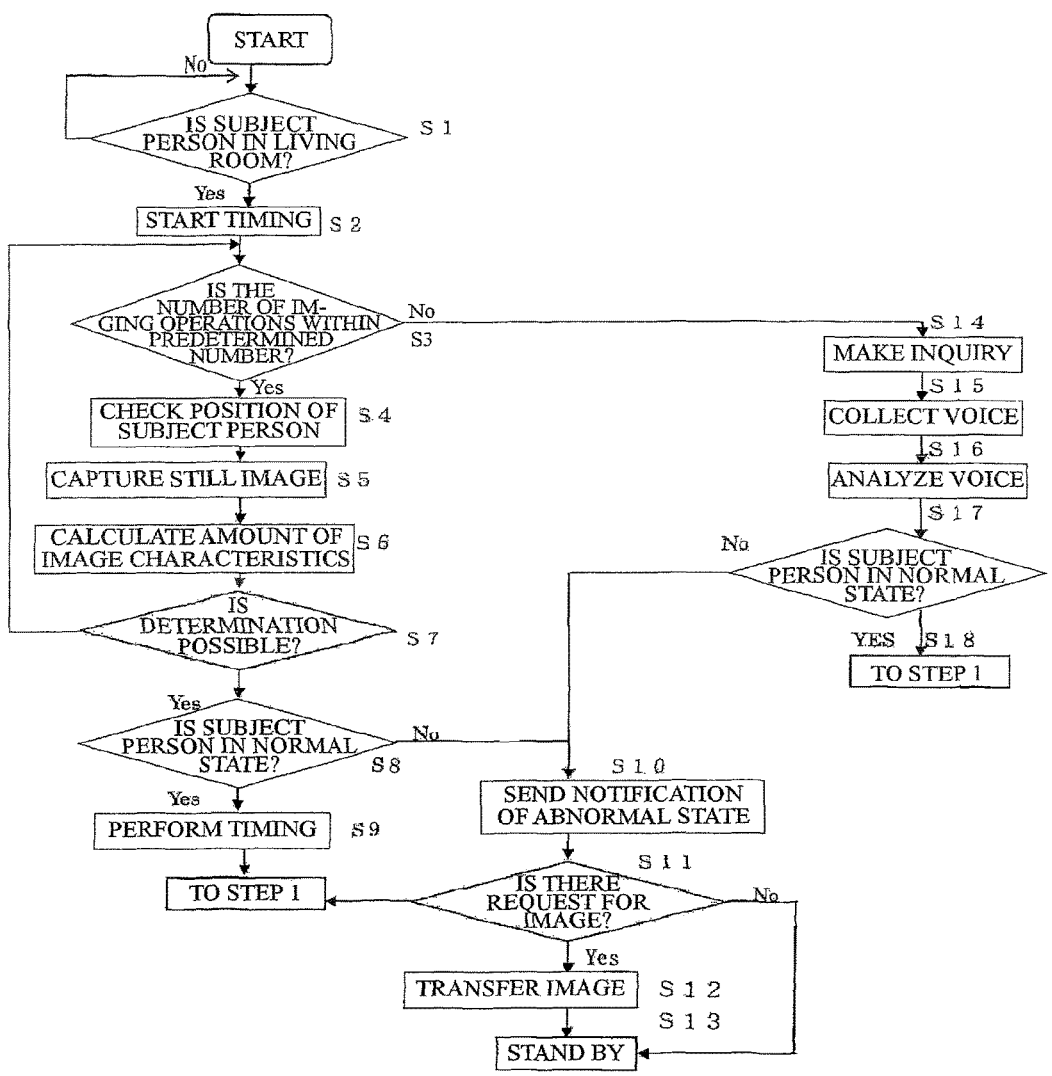
FIG. 11 is a flowchart showing operations of the image determining device.

FIG. 11 is a flowchart showing operations of the image determining device of this embodiment. In the following, the explanation is continued with reference to this flowchart.

Based on the output of the pyroelectric sensor 6, the CPU 14 determines whether the subject person is present in the living room (step 1). If the subject person is present in the living room, the CPU 14 moves on to step 2. If the subject person is not present in the living room, the CPU 14 repeats step 1.

The CPU 14 controls the calendar unit 12, to start the timing (step 2). Step 2 is the step for setting the intervals at which a still image is captured when the subject person is in a normal state, in conjunction with step 8, which will be described later.

The CPU 14 determines whether the number of times a still image has been captured is a predetermined number of times (step 3). Step 3 is the step for taking measures to plot the next move when the state of the subject person cannot be determined even after continuous still images of the subject person are captured in a case where it is difficult to determine the state of the subject person as described later. In this embodiment, the predetermined number of times a still image is to be captured is 300 to 500, for example, and the imaging time is approximately 3 to 5 minutes.

The CPU 14 checks the position of the subject person, based on the output of the imaging element of the imaging unit 2 (step 4). This is to correct for the influence of an aberration of the wide-angle lens system in accordance with the position of the subject person. In the following, the influence of an aberration of the wide-angle lens system is described.

As described above, the wide-angle lens system of this embodiment is designed to have a view angle of 80 degrees, and a focal length of 6.188 mm. Therefore, where the height of the ceiling of the living room is 2.6 m, and the height of the subject person is 1.6 m, a circle (approximately 100 m$^2$) having a radius of 5.67 m from a point immediately below the wide-angle lens system is the imaging area of the imaging unit 2. Accordingly, as long as the room is a standard-sized room, the head of the subject person can be imaged by the wide-angle lens system of this embodiment, no matter which part of the room the subject person is in.

When the subject person is present almost immediately below the wide-angle lens system (when the angle of view is low), the image size of the head of the subject person is proportional to f·tan θ (f being the focal length). Therefore, the relationship between the height of the head from the floor and the size (the diameter) of the image is as shown in FIG. 5B. The change in the image when the height of the head is changed by 300 mm, from 400 mm from the floor to 100 mm from the floor, is 68 µm, which is equivalent to approximately 12 pixels. Accordingly, when the subject person is present almost immediately below the wide-angle lens system, the image determining device 1 of this embodiment can detect a 300-mm change in the height of the head of the subject person.

Figure 12:
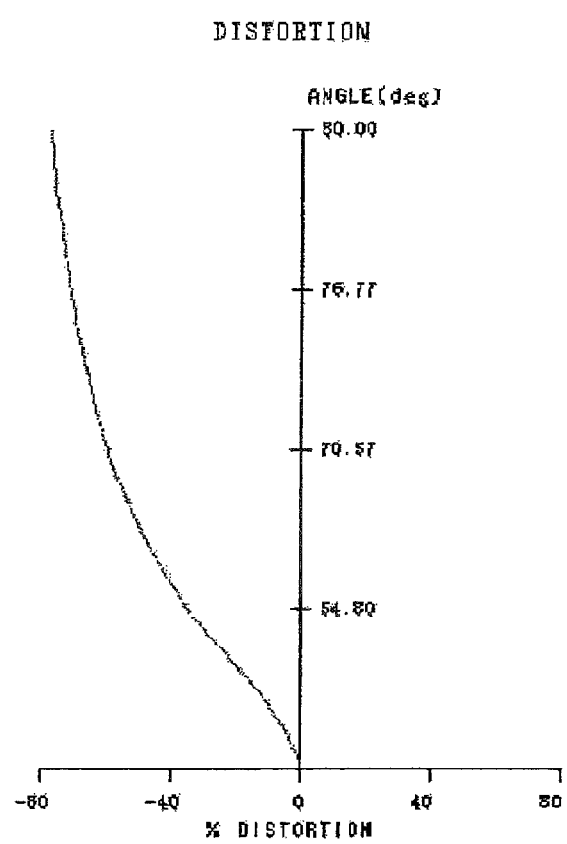
FIG. 12 is a diagram showing the influence of distortions of the wide-angle lens system in accordance with anticipated angles with respect to the subject person.

Next, a case where the subject person is in an intermediate view-angle position (at a view angle of approximately 70 degrees) is described. FIG. 12 is a graph showing the relationship between the view angle of the wide-angle lens system and the distortion. As shown in the graph, the distortion becomes larger as the angle of view becomes larger. At a view angle of 70 degrees, there is influence of a distortion of approximately −50%. Therefore, even if the distances from the front-side focal point of the wide-angle lens system are the same, the image size at a view angle of approximately 70 degrees is almost a half of the image size obtained when the subject person is present almost immediately below the wide-angle lens system. However, the change in the image size caused when the height of the head of the subject person is changed by 300 mm at a view angle of approximately 70 degrees is almost equivalent to 6 pixels. Therefore, the image determining device 1 of this embodiment can detect a 300-mm change in the height of the head of the subject person even at a view angle of approximately 70 degrees. In this case, the image determining device 1 detects the head of the subject person obliquely from above. Therefore, the size of the head may be corrected by taking into account the horizontal-to-vertical ratio of the head in accordance with the anticipated angle with respect to the wide-angle lens system.

Lastly, a case where the subject person is in an outermost peripheral view-angle position (at a view angle of approximately 80 degrees) is described. As shown in FIG. 12, at a view angle of approximately 80 degrees, there is influence of a distortion of approximately −80%, and the magnification is almost 20% of the magnification at the center view angle. Further, the distance from the front-side focal point of the wide-angle lens system to the head of the subject person is longer than the distance observed when the subject person is present at the center view angle. Therefore, a change in the image size in a case where the height of the head is changed becomes smaller. Specifically, in a case where the subject person is present at a view angle of approximately 80 degrees, the change in the image size caused when the height of the head is changed by 300 mm is almost equivalent to one pixel. Therefore, it is difficult for the image determining unit 1 of this embodiment to detect a 300-mm change in the height of the head of the subject person at a view angle of approximately 80 degrees. However, even if the room is a living room, an outermost peripheral view-angle position of the wide-angle lens system is a corner of the room, and there are structural objects each having a known size, such as a window and a door. In view of this, images of the window and the door in corners of the room are captured in this embodiment, and positions of the head of the subject person are associated with the positions of the structural objects such as the window and the door, so that a change in the position of the head of the subject person can be detected even in an outermost peripheral view-angle position of the wide-angle lens system.

If two or more wide-angle lens systems are provided, the accuracy of detection performed when the subject person is present in a corner of the room can be made higher, and it is possible to cope with a larger living room.

In a case where the number of times imaging has been performed is 300 to 500, which has been determined in step 3, a still image is captured in step 5, and the amount of image characteristics is calculated in step 6. Specifically, the size of the head in the Z-direction is associated with the X- and Y-directions, and is calculated from the captured still image.

The CPU 14 determines whether the state of the subject person can be determined from the position of the subject person in the X- and Y-directions and the calculated head size (step 7).

Figure 13:
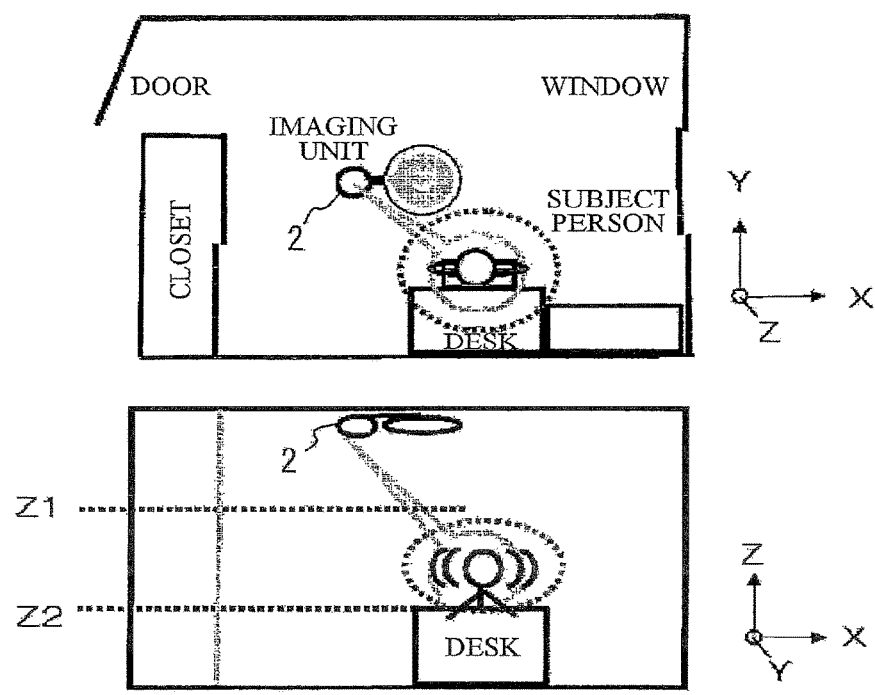
FIG. 13 is a diagram illustrating a situation where the subject person is sitting in a chair in front of a desk.

FIG. 13 is a diagram illustrating a situation where the subject person is sitting in a chair in front of a desk. As shown in FIG. 13, when the subject person is sitting in a chair, the size of the head is not much different from that in a case where the subject person is having a problem and leaning against the chair or is sleeping at the desk. In such a case, it is difficult to determine whether the subject person is in a normal state or in an abnormal state. As described above, the image determining device 1 can recognize an approximately 100-mm difference in height. However, when the anticipated angle of the wide-angle lens system with respect to the subject person is large, or when the subject person is sitting in a chair, the distance from the wide-angle lens system becomes longer, and therefore, step 7 is provided.

In such a case, the CPU 14 determines that a check cannot be made to determine whether the subject person is in a normal state, and returns to step 3. A still image is then captured several hundred times in several minutes as described above, and attention is paid to the head of the subject person as indicated by the dotted-line circles. A check is then made to determine whether the head is moving.

If the CPU 14 determines that the state of the subject person can be determined after the predetermined number of imaging operations, the CPU 14 determines the state of the subject person in step 8.

If the CPU 14 determines that the subject person is in a normal state, the CPU 14 stands by until a predetermined period of time (15 minutes since the start of the timing, for example) passes in step 9. After that, the CPU 14 returns to step 1. Even when the subject person is in a normal state, the CPU 14 notifies the designated device that there is no problem, at intervals (at 8-hour intervals; 7 am, 3 pm, and 11 pm, for example) set in the setting unit 7.

If the CPU 14 determines that the subject person is in an abnormal state, the CPU 14 moves on to step 10.

Figure 14:
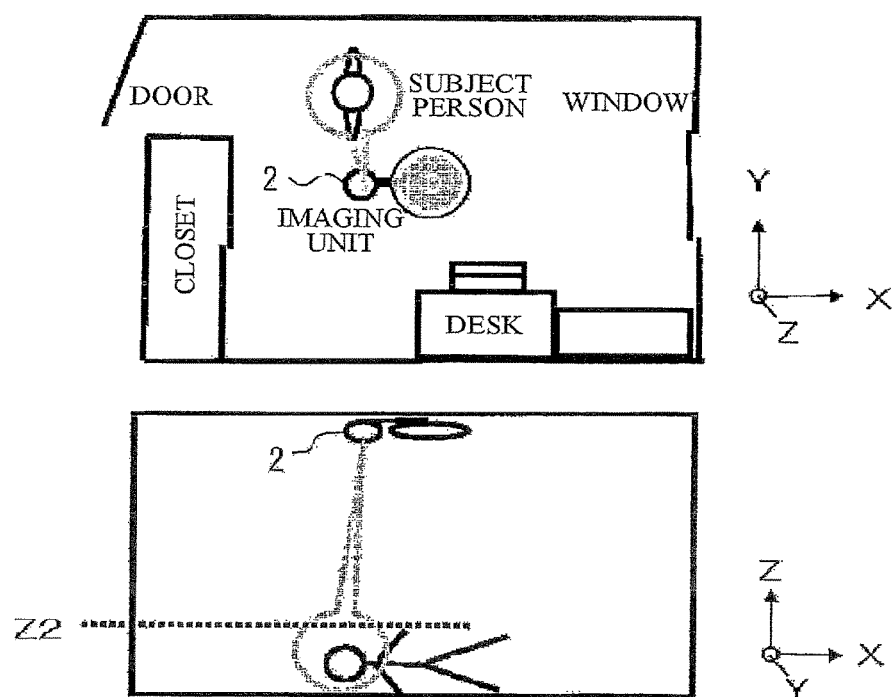
FIG. 14 is a still image captured when the subject person is determined to be in an abnormal state.

FIG. 14 shows a still image captured when the subject person is determined to be in an abnormal state. As shown in FIG. 14, even though the subject person is in the walking area of the living room in the X- and Y-directions, the height of the head of the subject person is lower than Z2 and is on the floor of the living room. In this case, the size of the head of the subject person is much smaller than the size of the head in the walking area, and therefore, the CPU 14 determines that there is something wrong with the subject person.

In step 10, the CPU 14 notifies the designated device that the subject person is in an abnormal state.

The CPU 14 determines whether there is a request for an image from a portable telephone or a personal computer of a family member with a low privacy level that is set in advance (step 11). If there is a request for an image, an image is transferred in step 12, and an instruction from the designated device is awaited (step 13). Even in transferring an image in step 12, the CPU 14 prohibits a transfer of any still image captured while the subject person is determined to be in a normal state, and transfers an image captured when the subject person is determined to be in an abnormal state. In this manner, the privacy of the subject person is secured.

If there is not a request for an image, the CPU 14 moves on to step 13, and awaits an instruction from the designated device. When the image determining device of this embodiment transfers an image, either a still image or a video image can be transferred.

Meanwhile, if the CPU 14 determines, in step 3, that the number of imaging operations performed exceeds the predetermined number, the CPU 14 moves on to step 14. The CPU 14 then uses the speaker 10, to talk to the subject person, "Are you all right?" or "How are you feeling?." At this point, the CPU 14 controls the interface unit 8 to lower the volume of the sound source device such as an audio device (or to mute the audio).

The CPU 10 collects the voice of the subject person via the microphone 9 (step 15), and uses an audio dictionary (not shown) to carry out an audio analysis (step 16). In this case, the phrases the subject person would use are limited to rather typical ones, such as "I'm all right," "What?," "I feel ill," and "Help me." Therefore, the audio dictionary does not become large (complicated), and there is no need to carry out a sophisticated audio analysis such as breaking down a conversation into individual words.

The speaker 10 and the microphone 9 are directed toward the position of the subject person by a drive unit (not shown) such as a stepping motor, so that the inquiry through the speaker 10 and the voice collection by the microphone 9 can be efficiently conducted.

If the CPU 14 recognizes a phrase indicating a normal state from the subject person, the CPU 14 returns to step 1. If there is a phrase indicating an abnormal state from the subject person or there is no response from the subject person, the CPU 14 determines that the subject person is in an abnormal state, and moves on to step 10 (step 17).

Prior to the notification of an abnormal state in step 10, an inquiry through the microphone 9 may be made as shown in step 14. In this manner, a more specific notification indicating not only that the subject person is having a problem but also that the subject person is having a headache or is unable to speak or the like can be sent to the designated device.

Modification

In the above described embodiment, the imaging unit 2 is attached to the ceiling, and images of the head of a subject person are captured from above. However, the imaging unit 2 may be installed in a living room or a bedroom so that images of a subject person can be captured from the side. By capturing images of the subject person from the side, movement of the eyes, the mouth, the nose, and the like can be easily determined. Further, still images captured by the imaging unit 2 attached to the ceiling and still images of the subject person captured from the side can be used at the same time in determining whether the subject person is in a normal state. In this manner, determination with higher precision can be performed.

Also, in the above described embodiment, a check is made to determine whether the subject person is present in a living room by the pyroelectric sensor 6. However, the intervals at which the imaging unit 2 performs imaging may be shortened, and, based on the results of the imaging, a check may be made to determine whether the subject person is present in the living room. In this case, the pyroelectric sensor 6 may not be provided.

In the above described embodiment, the image determining device of this embodiment is installed in a living room or a bedroom. However, the image determining device may of course be installed in a hallway, a restroom, a bathroom, or the like, and can also be used in an office or a school.

While the exemplary embodiments of the present invention have been illustrated in detail, the present invention is not limited to the above-mentioned embodiments, and other embodiments, variations and modifications may be made without departing from the scope of the present invention.

The invention claimed is:

1. An imaging device comprising:
   an imaging sensor that, when at least one of a first person and a second person moves from an imaging area of the imaging sensor to a non-imaging area of the imaging sensor, captures image data including the first person, the second person, and an object;
   a processor configured to:
      acquire height information about the first person and height information about the second person based on the object included in the image data; and
      identify the first person and the second person based on the height information about the first person and the height information about the second person; and
   an output unit that outputs information indicating abnormality when at least one of the first person and the second person is in an abnormal state.

2. The imaging device of claim 1, wherein the processor determines a state of at least one of the first person and the second person based on the height information about the first person and the height information about the second person.

3. The imaging device of claim 1, wherein the imaging sensor images the heads of the first person and the second person.

4. The imaging device of claim 1, wherein the processor acquires respective heights of the first person and the second person as the height information.

5. The imaging device of claim 1, wherein the imaging sensor simultaneously images the first person and the second person.

6. The imaging device of claim 1, wherein the imaging sensor images the first person and the second person when the first person and the second person are in the same posture.

7. The imaging device of claim 1, wherein the information indicating abnormality is image data including the one of the first person and the second person who is in an abnormal state.

8. The imaging device of claim 7, wherein the image data including the one who is in an abnormal state is displayed on a display.

9. The imaging device of claim 1, wherein the information indicating abnormality is output by way of a speaker.

10. An imaging device comprising:
    a lens;
    an imaging sensor that, when at least one of a first person and a second person moves from an imaging area of the imaging sensor to a non-imaging area of the imaging sensor, captures image data including the first person, the second person, and an object based on light through the lens; and
    a processor configured to:
       acquire height information about the first person and height information about the second person based on the object included in the image data;
       identify the first person and the second person based on the height information about the first person and the height information about the second person; and
       output information indicating abnormality when at least one of the first person and the second person is in an abnormal state.

11. The imaging device of claim 10, wherein the information indicating abnormality is output by way of a speaker.

* * * * *